US012198395B2

(12) United States Patent
Taheri et al.

(10) Patent No.: US 12,198,395 B2
(45) Date of Patent: Jan. 14, 2025

(54) OBJECT LOCALIZATION IN VIDEO

(71) Applicant: ObjectVideo Labs, LLC, Tysons, VA (US)

(72) Inventors: Sima Taheri, McLean, VA (US); Gang Qian, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 493 days.

(21) Appl. No.: 17/557,941

(22) Filed: Dec. 21, 2021

(65) Prior Publication Data
US 2022/0230410 A1 Jul. 21, 2022

Related U.S. Application Data

(60) Provisional application No. 63/138,867, filed on Jan. 19, 2021.

(51) Int. Cl.
G06V 10/24 (2022.01)
G06T 7/55 (2017.01)
(Continued)

(52) U.S. Cl.
CPC ............. *G06V 10/247* (2022.01); *G06T 7/55* (2017.01); *G06T 7/74* (2017.01); *G06V 10/225* (2022.01); *G06V 10/25* (2022.01)

(58) Field of Classification Search
CPC . G01J 1/00–60; G06V 10/247; G06V 10/242; G06V 10/753; G06V 10/58;
(Continued)

(56) References Cited

U.S. PATENT DOCUMENTS 5,917,937 A * 6/1999 Szeliski ............... G06T 7/593
348/E13.059
6,198,852 B1 * 3/2001 Anandan ............... G06T 7/97
382/284

(Continued)

FOREIGN PATENT DOCUMENTS

WO  WO-2019099515 A1 * 5/2019 ......... G06K 9/00664

OTHER PUBLICATIONS

Detone et al., "SuperPoint: Self-Supervised Interest Point Detection and Description," CVPRW, Apr. 19, 2018, 13 pages.

*Primary Examiner* — Manav Seth
(74) *Attorney, Agent, or Firm* — Fish & Richardson P.C.

(57) ABSTRACT

Disclosed are methods, systems, and apparatus for object localization in video. A method includes obtaining a reference image of an object; generating, from the reference image, homographic adapted images showing the object at various locations with various orientations; determining interest points from the homographic adapted images; determining locations of an object center in the homographic adapted images relative to the interest points; obtaining a sample image of the object; identifying matched pairs of interest points, each matched pair including an interest point from the homographic adapted images and a matching interest point in the sample image; and determining a location of the object in the sample image based on the locations of the object center in the homographic adapted images relative to the matched pairs. The method includes generating a homography matrix; and projecting the reference image of the object to the sample image using the homography matrix.

19 Claims, 6 Drawing Sheets

(51) Int. Cl.
*G06T 7/73* (2017.01)
*G06V 10/22* (2022.01)
*G06V 10/25* (2022.01)

(58) Field of Classification Search
CPC .. G06V 10/143; G06V 10/751; G06V 10/145; G06V 10/60; G06V 10/225; G06V 10/25; G06V 10/255; G06V 10/44; G06V 10/7715; G06V 10/56; G06V 10/761; G06V 10/74; G06V 10/762; G06V 40/10; G06V 10/26; G06V 10/46; G06V 40/165; G06V 40/171; G06V 10/70; G06V 10/764; G06V 40/172; G06V 20/52; G06V 20/36; G06V 20/40; G06T 2207/30208; G06T 7/246; G06T 2207/30204; G06T 7/50; G06T 7/90; G06T 2207/20164; G06T 2207/10028; G06T 7/73; G06T 7/60; G06T 7/13; G06T 7/12; G06T 7/80; G06T 2207/30232; G06T 7/55; G06T 7/74; G06T 7/593; G06T 2207/10016; G01C 21/005; G01B 11/14; G06F 18/2413; H04N 7/183; H04N 7/185; H04Q 2209/823; H04Q 9/00; G08B 25/00; G05B 15/02; G06Q 10/109
See application file for complete search history.

(56) References Cited

U.S. PATENT DOCUMENTS

| | | | | |
|---|---|---|---|---|
| 7,382,897 B2 | 6/2008 | Brown et al. | | |
| 7,901,095 B2 | 3/2011 | Xiao et al. | | |
| 7,929,775 B2* | 4/2011 | Hager | ............... | G06V 20/653 |
| | | | | 382/154 |
| 8,264,542 B2* | 9/2012 | Lee | ............... | G06V 10/25 |
| | | | | 386/223 |
| 8,379,014 B2* | 2/2013 | Wiedemann | ............... | G06V 30/1914 |
| | | | | 345/428 |
| 8,488,040 B2* | 7/2013 | Chen | ............... | G06F 16/5854 |
| | | | | 348/333.02 |
| 8,670,619 B2 | 3/2014 | Funayama et al. | | |
| 8,693,785 B2* | 4/2014 | Suk | ............... | G06V 10/40 |
| | | | | 382/209 |
| 8,805,002 B2* | 8/2014 | BenHimane | ............... | G06T 7/246 |
| | | | | 382/103 |
| 8,970,709 B2* | 3/2015 | Gonzalez-Banos | .... | G01C 11/02 |
| | | | | 348/169 |
| 9,013,550 B2* | 4/2015 | Jiang | ............... | G06T 7/74 |
| | | | | 348/46 |
| 9,153,027 B2* | 10/2015 | Gallo | ............... | G06T 7/35 |
| 9,213,900 B2* | 12/2015 | Bernal | ............... | G06V 20/52 |
| 9,665,777 B2* | 5/2017 | Naikal | ............... | G06V 20/52 |
| 9,876,993 B2* | 1/2018 | Sablak | ............... | H04N 7/183 |
| 10,009,586 B2* | 6/2018 | Mutter | ............... | G09F 19/228 |
| 10,659,750 B2* | 5/2020 | Meier | ............... | H04N 13/221 |
| 10,726,570 B2 | 7/2020 | DeTone et al. | | |
| 10,977,554 B2* | 4/2021 | Rabinovich | ............... | G06V 10/462 |
| 11,062,209 B2 | 7/2021 | DeTone et al. | | |
| 11,663,849 B1* | 5/2023 | Ross | ............... | G06V 10/462 |
| | | | | 382/181 |
| 12,033,528 B2* | 7/2024 | Suddreth | ............... | G06T 3/4038 |
| 12,062,191 B2* | 8/2024 | Datar | ............... | G06V 10/764 |
| 12,075,769 B2* | 9/2024 | Humpal | ............... | B05B 12/124 |
| 2018/0075593 A1* | 3/2018 | Wang | ............... | G06V 40/103 |
| 2024/0291994 A1* | 8/2024 | Abbasi | ............... | H04N 19/91 |

* cited by examiner

OBJECT LOCALIZATION IN VIDEO

CROSS-REFERENCE TO RELATED APPLICATIONS

This application claims the benefit of the U.S. Provisional Patent Application No. 63/138,867 filed Jan. 19, 2021, which is incorporated herein by reference in its entirety.

TECHNICAL FIELD

This disclosure application relates generally to surveillance cameras.

BACKGROUND

Many properties are equipped with monitoring systems that include sensors and connected system components. Some property monitoring systems include cameras.

SUMMARY

Techniques are described for object localization in video.

Many residents and homeowners equip their properties with monitoring systems to enhance the security, safety, or convenience of their properties. A property monitoring system can include cameras that can obtain visual images of scenes at the property. A camera can detect and localize objects within a field of view (FOV).

In home security and smart home applications, there are scenarios in which it is desirable to localize an object in the camera field of view or in an area of interest within the field of view. The object can be a doormat, a trashcan, a bench, etc. As an example, a touchless doorbell that includes a camera may have a region in a camera field of FOV that is monitored for human detection. If a human is detected standing in the region, the doorbell rings. To make the region well-defined, a doormat may be classified as the region of interest. The camera can localize the doormat in the camera FOV and monitor the doormat for a human standing event. When the camera detects that a person is standing on the doormat, the camera triggers the doorbell to ring.

The described techniques can be used to perform object localization without requiring a large corpus of data with annotations. Thus, object localization can be performed while reducing the amount of data and processing required. This can reduce the amount of data storage and power needed to perform object localization, and can also improve the speed of performing object localization.

The described techniques use a reference image of an object of interest to generate a model, or representation, of the object. The process for generating the object representation may also consider camera calibration parameters and camera FOV. The object representation can be generated using multiple homographic and photometric augmented images of the reference image. This approach provides a form of self-supervision which boosts the geometric and photometric consistency of interest points and their local descriptors. Aggregation of all these representations by mapping local descriptors to the reference image and fusing them will generate a robust model for the object.

The generated object representation can be used to localize the object in different conditions in FOV. For example, a camera can use the object representation to localize the object in various lighting conditions and weather conditions, and at various distances and orientations.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
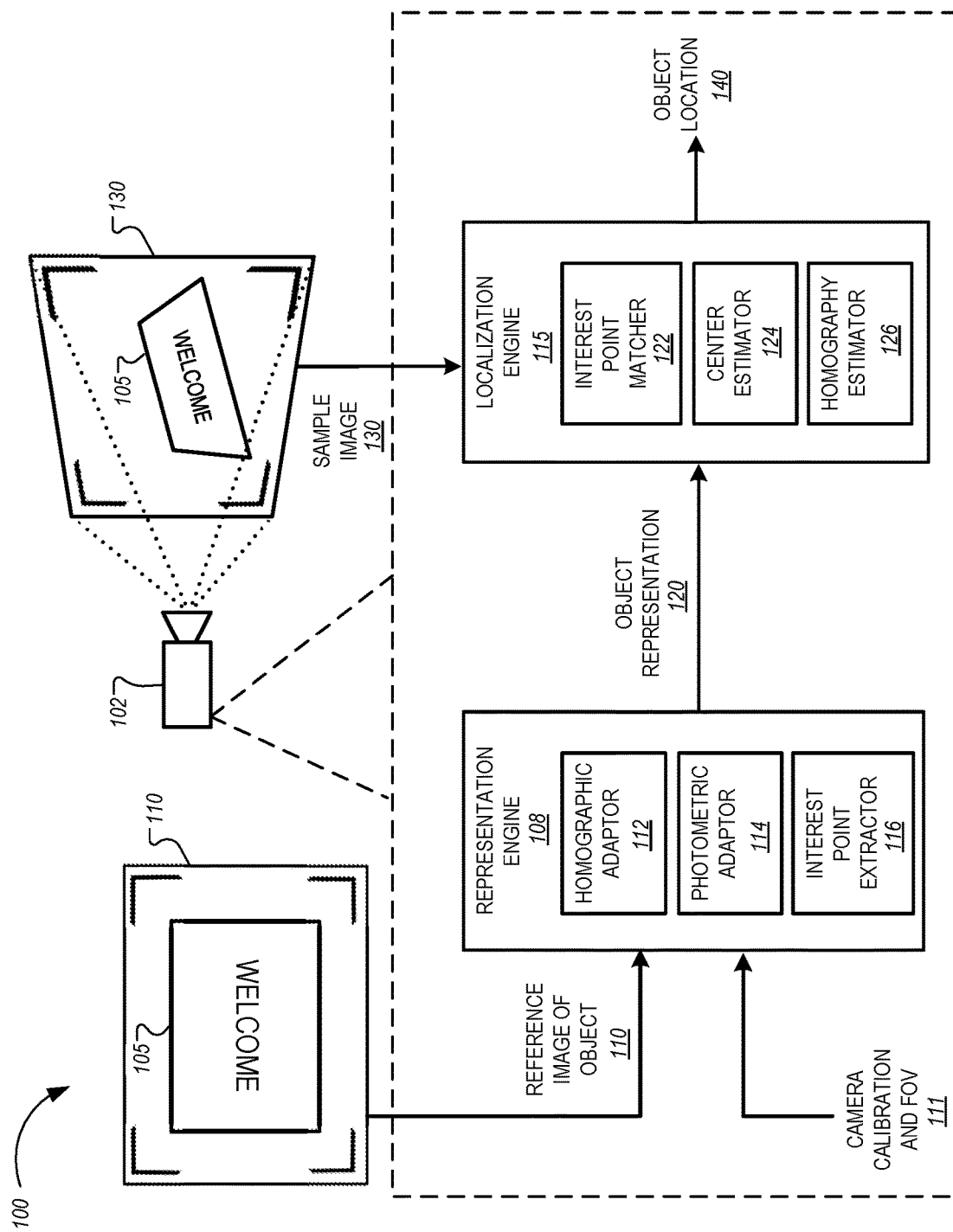
FIG. 1 illustrates an example system for object localization in video.

FIG. 1 illustrates an example system 100 for object localization in video.

The system 100 includes a camera 102 that captures video. The video includes multiple image frames captured over time. The camera 102 can perform video analysis on the video. Video analysis can include detecting, identifying, and tracking objects in the video.

The camera 102 can localize objects in the video. For example, the camera 102 can determine a shape, size, and orientation of an object in image frames of the video. The location of an object in an image frame can be described using pixel locations. For example, the image frame may include a grid of pixels having an x-axis and a y-axis. The location of each pixel may correspond to a respective x value and y value of the grid. The camera 102 can localize the object by determining locations of features of the object such as a center, edges, corners, etc.

The camera 102 includes a representation engine 108. The representation engine 108 generates an object representation 120 from a reference image 110 using camera calibration and field of view (FOV) 111. The representation engine 108 includes a homographic adaptor 112, a photometric adaptor 114, and an interest point extractor 116.

The reference image is an image of an object that is to be localized by the camera 102. For example, the reference image 110 includes an object 105 that is a doormat. The doormat includes text of the word "WELCOME." The camera 102 generates a representation of the doormat in order to localize the doormat in video. When the location of another object overlaps with the location of the doormat, the camera 102 may perform an action. For example, when a package is left on the doormat, and the location of the package overlaps with the location of the doormat, the camera 102 may send an instruction to activate a doorbell chime. In another example, when a person steps on the doormat, the camera 102 may send an instruction to illuminate a porch light.

From the reference image 110, the representation engine 108 can determine features of the object 105. For example, the representation may determine a size and shape of the object 105. Though the example object illustrated in FIG. 1 is a quadrilateral shape, the process for generating an object representation 120 can be used for objects having other planar shapes. For example, the processes for localizing objects in video can be applied to an object having another polygonal shape such as a triangular, pentagonal, hexagonal, or octagonal shape. In some examples, the processes for localizing objects in video can be applied to an object having a non-polygonal shape such as a circular, semicircular, oblong, or elliptical shape.

The representation engine 108 receives camera calibration data and the camera FOV 111. Camera calibration data can include intrinsic and extrinsic camera parameters. For example, camera calibration data can include camera height, focal length, imaging plane position, orientation, tilt, lens distortion, etc. The camera FOV can include an angular FOV of the camera, an optical axis of the camera 102, and a range of the camera 102.

The object representation 120 includes a robust local representation for the object 105. The robust local representation includes a set of robust interest points that are selected based on aggregated probability and repeatability. A process for generating the object representation 120 is described in greater detail with reference to FIG. 2.

The camera 102 includes a localization engine 115 that determines an object location 140 in a sample image 130 based on the object representation 120. The localization engine 115 includes interest point matcher 122, a center estimator 124, and a homography estimator 126.

The sample image 130 may be an image captured by the camera 102. For example, the sample image 130 may be an image of the object 105 positioned in an area that is monitored by the camera 102. As an example, the sample image 130 may be an image of the doormat on a porch of a property.

The object location 140 can include pixel coordinates of features of the object 105. For example, the object location 140 can include pixel coordinates of a center of the object 105, pixel coordinates of corners of the object 105, etc. A process for determining the object location 140 is described in greater detail with reference to FIG. 3

Figure 2:
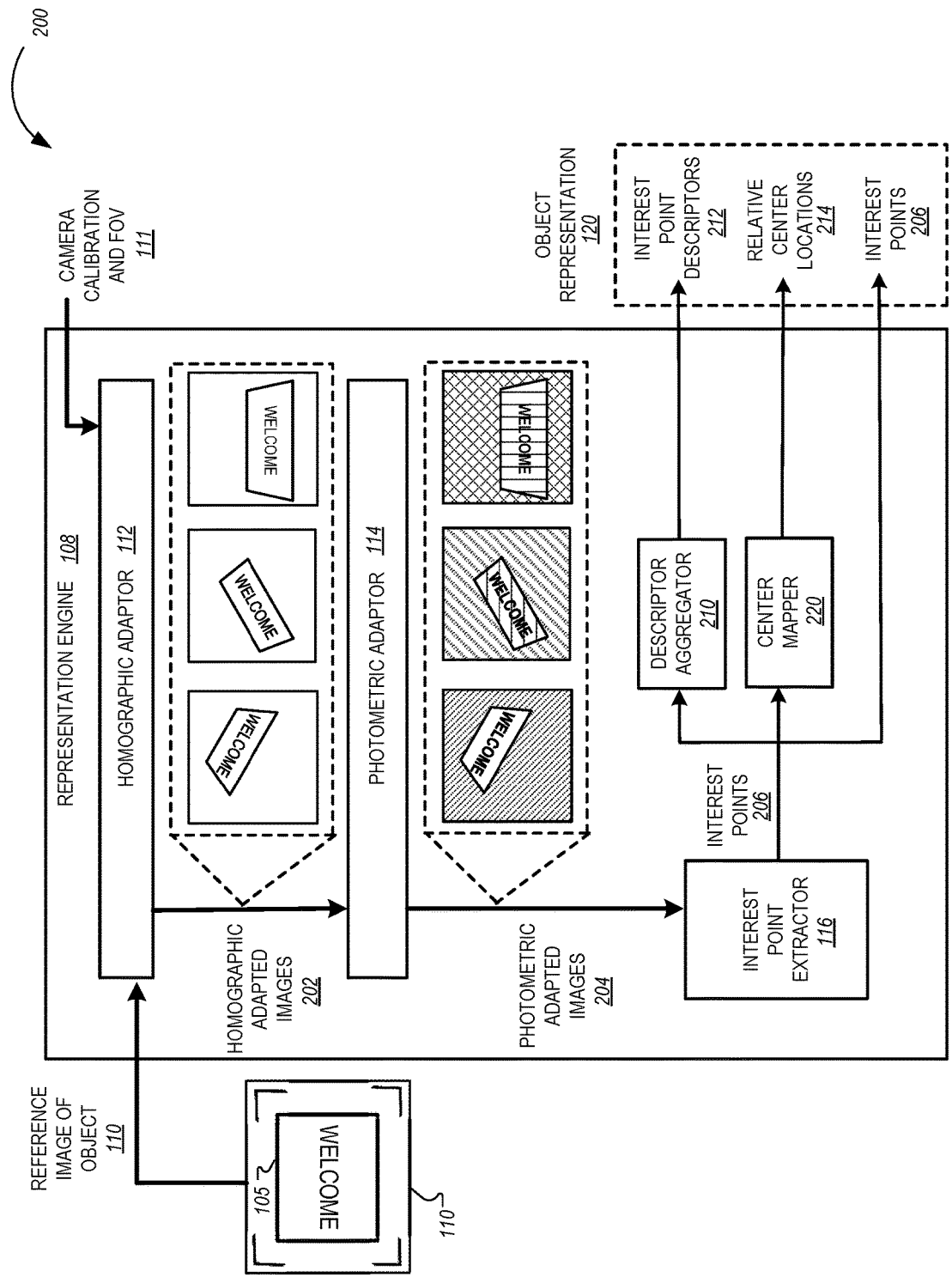
FIG. 2 illustrates an example system for generating a representation of an object using homographic adaptation.

FIG. 2 illustrates an example system 200 for generating a representation of an object using homographic adaptation.

The homographic adaptor 112 generates various homographic augmentations of the object 105. For example, the homographic adaptor 112 can generate homographic adapted images 202. The homographic adaptor 112 uses the calibration camera and FOV 111 to generate the homographic adapted images 202. Based on the camera calibration parameters, the reference image of the object 105 is projected to the camera FOV. The projection process simulates an image recording using the camera 102. For example, if the camera has lens distortion or if any de-warping algorithm is applied to the image before the image being recorded, those steps are considered in the homographic augmentation of the object 105. By varying the parameters regarding camera height and tilt and object distance from the camera, multiple homographic adaptations of the object 105 are created.

The homographic adaptations simulate various scenarios of object 105 placement in the camera FOV. For example, the homographic adapted images can depict the object at various ranges to the camera, e.g., closer to the camera and further from the camera. The homographic adapted images can also depict the object in rotated or tilted positions. The homographic adapted images can also depict the object in various locations of the FOV, e.g., near a center of the FOV, to the right of center, to the left of center, near a corner of the FOV, etc.

The photometric adaptor 114 generates various photometric adaptations of the object 105. For example, the photometric adaptor 114 can generate photometric adapted images 204 from the homographic adapted images 202. The photometric adapted images 204 are generated by applying local and global illumination augmentation. Illumination augmentation can include random changes in the brightness or contrast of the image, adding shade, adding highlights, etc.

In some implementations, photometric adaptation may be performed before homographic adaptation. In some implementations, homographic adaptation may be performed, and photometric adaptation might not be performed. In some implementations, photometric adaptation may be performed, and homographic adaptation might not be performed. Once the adapted images are generated, local descriptors are then extracted from the homographic and photometric augmented versions of the object 105 and are projected back to the reference image.

The interest point extractor 116 extracts interest points 206 and corresponding descriptors from the photometric adapted images 204. An interest point is a distinctive point that can be mapped between images. An interest point can be, for example, a point in an image where a significant change of an image property occurs. For example, an interest point can be a point in an image where a significant change in color, intensity, or texture occurs. Example interest point can be corners or edges of features of an image. By identifying interest points, an image processing system can map features between multiple images taken from different positions or at different times, in order to estimate parameters describing geometric transforms between images. In the example of FIG. 1, example interest points can correspond to any distinctive visible features of the doormat, such as edges of letters of the word "WELCOME." An interest point 206 can be represented, for example, by a two-dimensional pixel coordinate location of the center of the interest point.

The extracted interest points are aggregated over the photometric adapted images and projected back to the reference image 110. By aggregating over multiple images, the interest point extractor 166 extracts interest points with high stability and repeatability. To aggregate the information from multiple images, the interest point extractor 116 determines a probability of each interest point as well as the frequency of detecting a particular interest point at a particular location.

The probability is a measure of the strength of that interest point. The frequency is a measure of repeatability of the interest point. A strong interest point with a high probability is an interest point that has a well-defined position on a region of the object 105. The well-defined position of the interest point is stable under local and global perturbations in the image such as illumination and brightness variations.

Both the criteria of probability and frequency are used in order to generate robust representation for the object 105. The interest points are sorted and filtered based on their aggregated strength and repeatability. The interest point extractor 116 then selects interest points that meet probability and repeatability criteria, in order to obtain a set of robust interest points on the reference image 110. In some implementations, the criteria can include a threshold probability score, a threshold repeatability score, or both. Interest points with scores above the threshold scores may be selected, while interest points with scores below the threshold scores may be discarded.

The interest point extractor provides interest points to a descriptor aggregator 210 and a center mapper 220. As the interest points are aggregated from the homographic and photometric augmentations, the descriptor aggregator 210 aggregates descriptors for each interest point in the augmented images. The descriptors can include feature vectors describing the distinguishable appearance of local regions around each interest point. In some examples, local descriptors can be obtained using computer vision algorithms such as SIFT, SURF, and ORB. In some examples, local descriptors can be deep descriptors obtained using deep learning methods such as SuperPoint, UnsuperPoint, and KP2D and so on.

The descriptor aggregator 210 aggregates the descriptors per interest point and generates a list of interest point descriptors 212. Since the interest point descriptors 212 are generated based on homographic and photometric adapted images, the descriptors can include descriptions of scale, gradient change, illumination, brightness, contrast, shade, orientation, distance from camera, etc.

Because the selected interest points have high frequency, the size of the descriptor list per interest point may be large. To compress the representation per interest point, the descriptor aggregator can apply a clustering algorithm, e.g. density-based spatial clustering of applications with noise (DBSCAN), to the list of descriptors per interest point. The descriptor aggregator 210 can then replace the list with descriptors for the center of the clusters. This produces a robust and compressed local representation model for the object 105. Other approaches like principal component analysis (PCA) or dictionary learning can be employed as well to learn a representative subspace for each interest point. In this way, descriptors for an interest point can describe the local region around the feature point.

The center mapper 220 identifies the relative center locations 214 for each interest point relative to the center of the object in the reference image 110. The center mapper 220 may determine a location of the object center in the reference image 110, e.g., using geometric computations. The geometric computations of the object center can be based on properties (shape, size, etc.) of the object 105. To obtain the relative center location, the center mapper 220 determines the relative location of the computed object center with respect to each interest point 206.

In some examples, the relative center location can be a two-dimensional pixel offset between the interest point and the center of the object. For example, for an object center positioned at coordinate $[x_1, y_1]$ and an interest point positioned at coordinate $[x_2, y_2]$, the relative center location can be represented as an offset $[x_2-x_1, y_2-y_1]$. The relative center location information is linked to each local descriptor and is maintained after the descriptor compression process.

The object representation 120 includes the interest points 206 projected back to the reference image 110. Each interest point is linked to the corresponding interest point descriptors 212 and the relative center location 214. The object representation 120 is a robust local representation for the object 105.

Figure 3:
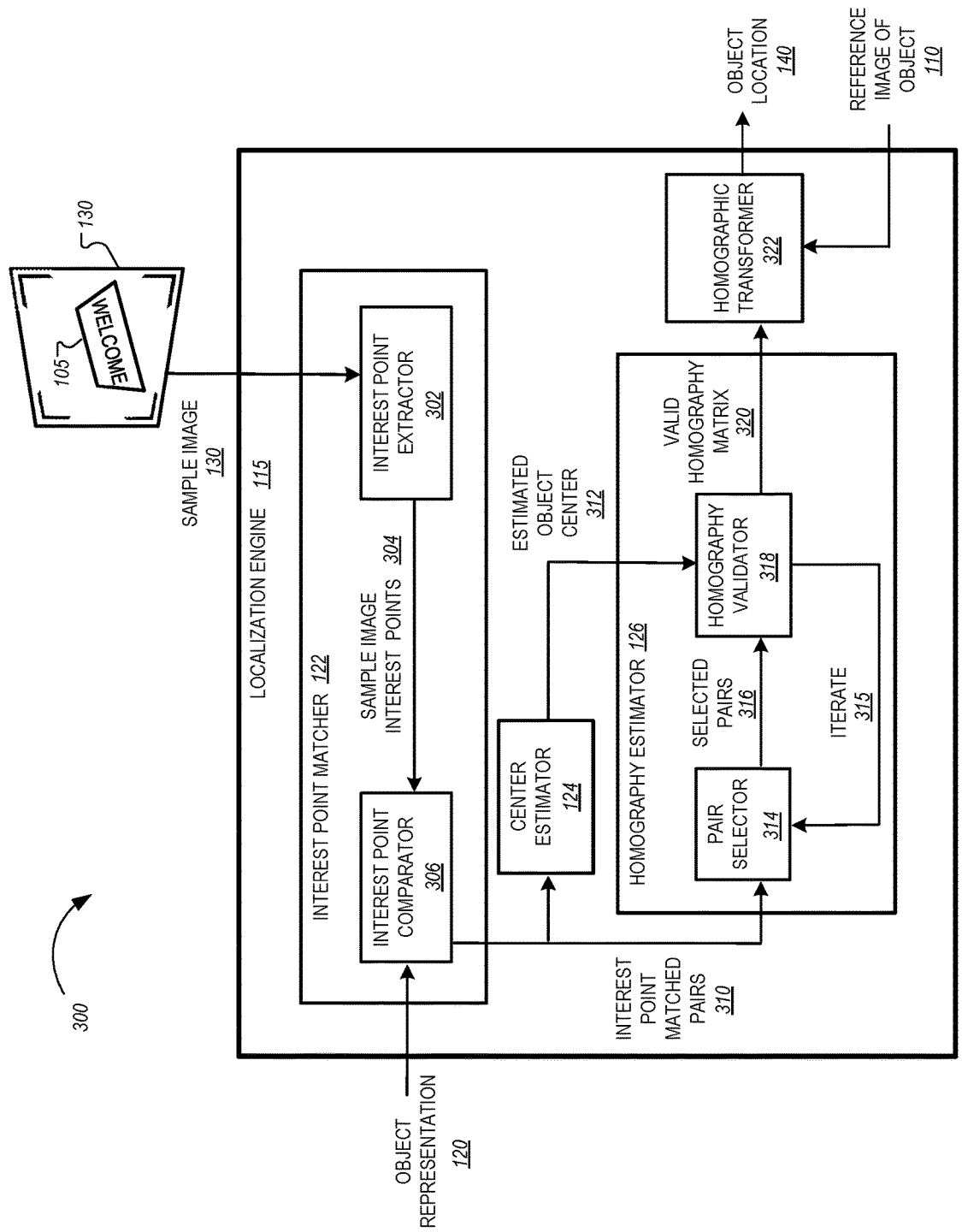
FIG. 3 illustrates an example system for localizing an object in a sample image using the generated representation.

FIG. 3 illustrates an example system 300 for localizing an object in a sample image using the generated object representation 120.

Given a sample image 130 that includes a depiction of the object 105 in it, the localization engine 115 can localize the object 105. The localization engine can localize the object 105 by determining a valid homography matrix 320 that maps the object 105 in the reference image 110 to the depiction of the object 105 in the sample image 130. The homography matrix 320 can be, for example, a 3×3 matrix that transforms a set of planar points in the reference image 110 to another set of planar points in the sample image 130. By applying the homography matrix 320 to the reference image 110, the localization engine can obtain the object location 140 within the sample image 130.

The localization engine 115 localizes the object 105 using the interest point matcher 122, the center estimator 124, and the homography estimator 126. The interest point matcher 122 includes an interest point extractor 302 and an interest point comparator 306. The interest point extractor 302 extracts local interest points and their descriptors from the sample image 130 in the same way that the interest point extractor 116 extracts interest points and their descriptors from the adapted images. The interest point extractor 302 provides sample image interest points 304 to the interest point comparator 306.

The interest point comparator 306 compares the sample image interest points 304 to the object representation 120. The interest point comparator 306 generates interest point matched pairs 310. An interest point matched pair includes an interest point from the sample image 130 and a matching interest point from the object representation 120. Matching interest points can be interest points that have the same or similar descriptors. For example, a similarity between the descriptors may meet similarity criteria. The interest point comparator 306 outputs the interest point matched pairs 310, including the descriptor information for the matched pairs.

The center estimator 124 determines an estimated object center 312 based on the interest points matched pairs 310. The center estimator 124 uses the relative center information associated with the matched descriptors to estimate the center location of the object 105 in the sample image 130. Because the object representation 120 includes relative center locations 214 for each interest point, each matched descriptor may include an estimated location of the object center relative to the respective interest point. The center estimator 124 can use the relative center information and the position of the matched interest point from the object representation to estimate the position of the center of the object 105 in the sample image 130.

For example, a particular interest point matched pair includes a particular sample image interest point and a particular matching interest point from the object representation 120. The particular matching interest point from the object representation 120 includes relative center location information indicating an offset of the center of the doormat relative to the particular matching interest point. Based on the position of the particular sample image interest point in the sample image 130, and the relative position of the center of the object relative to the particular matching interest point in the object representation 120, the center estimator 124 can estimate a center location of the doormat in the sample image 130.

The center estimator 124 can repeat estimating the center location of the object 105 in the sample image based on descriptors for multiple interest point matched pairs 310. The center estimator 124 can then cluster the multiple estimated locations using a clustering algorithm like DBSCAN to find the biggest cluster where the center estimates are located. The centroid of this largest cluster provides an estimated object center 312. Because the estimated object center 312 is determined from a number of interest point matched pairs 310, the estimated object center is well localized.

The homography estimator 126 generates a homography matrix based on the interest point matched pairs 310 and the estimated object center 312. The homography estimator 126 can use a random sample consensus (RANSAC)-based approach to obtain a robust and accurate estimate of the homography matrix.

The inputs to the homography estimator 126 include the interest point matched pairs 310 and the estimated object center 312. In some examples, the homography estimator 126 may receive additional information such as an area of interest of the sample image 130 where the object 105 is expected to be. For example, for a camera field of view that includes a porch, the doormat may be expected to be located on the porch. Thus, the porch may be identified as an area of interest. Other additional inputs to the homography estimator 126 can include an estimated size of the object 105. The estimated size of the object may be based on previous localizations of the object 105.

The homography estimator 126 includes a pair selector 314 and a homography validator 318. The pair selector 314 selects matched pairs and outputs the selected pairs 316 to the homography validator 318. The homography validator 318 computes homographies based on the selected pairs 316 and computes a score for each estimated homography using an iterative RANSAC process 315. The homography validator 318 can rank the homographies based on their homography scores. A process for validating homography estimates, computing homography scores, and generating a valid homography matrix 320 is described with reference to FIG. 4.

Figure 4:
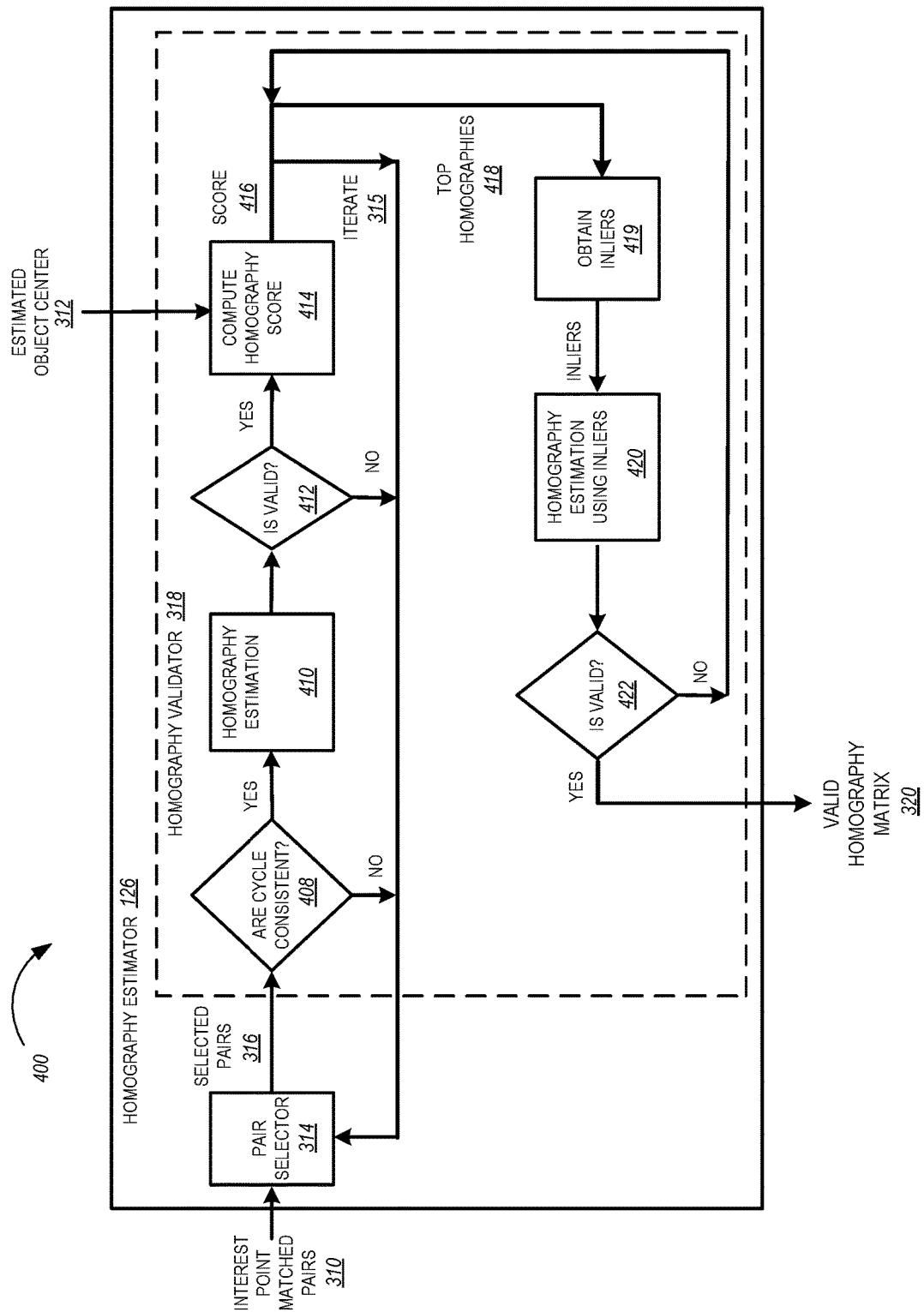
FIG. 4 is a flow diagram of an example process for homography estimation.

FIG. 4 shows a process 400 of homography estimation performed by the homography estimator 126. The homography estimator 126 receives interest point matched pairs 310. The pair selector 314 picks random matched pairs 316. For example, in each iteration 315, the homography estimator may randomly select four pairs of matched interest points. As an example, the homography estimator may select matched pairs including interest points $P_{1R}$, $P_{2R}$, $P_{3R}$, and $P_{4R}$ from the reference image 110 matched with interest points $P_{1S}$, $P_{3S}$, $P_{3S}$, and $P_{4S}$ from the sample image, respectively. The four pairs of selected matched interest points can thus be represented as $(P_{1R}, P_{1S})$, $(P_{2R}, P_{2S})$, $(P_{3R}, P_{3S})$, and $(P_{4R}, P_{4S})$.

The homography validator 318 determines whether selected pairs 406 are cycle consistent 408. The homography validator 318 can test the selected pairs 406 for cyclic consistency by determining whether the order of the points is the same in the reference image 110 and in the sample image 130. For example, if an order of points in a clockwise direction around the reference image 110 is $P_{1R}$, $P_{3R}$, $P_{4R}$, $P_{2R}$, then a consistent order in the sample image 130 would be $P_{1S}$, $P_{3S}$, $P_{4S}$, $P_{2S}$. If the selected pairs 406 are not cycle consistent 408, the selected pairs are discarded, and another set of pairs is selected.

If the selected pairs are cycle consistent, the homography validator 318 performs homography estimation 410. During homography estimation 410, a homography matrix is estimated using the selected four pairs of matched points.

The estimated homography is validated 412 before being accepted. The homography validator 318 validates the estimated homography by imposing a number of constraints.

An example constraint can be to verify that corner points of the shape of the object 105 are all located within the sample image 130. To validate the projected shape, the corners of object 105 are projected from the reference image 110 to the sample image 130. For the homography to be valid all projected corner points should be positive, e.g., should be located inside the sample image 130.

Another example constraint can be to verify that the size of the object meets size criteria. For example, the size of the object can be compared to a minimum size. The minimum size may be, for example, 3000 pixels, 2500 pixels, or 2000 pixels.

Another example constraint can be to verify that the shape of the object is convex. The shape is convex if, for any two points in the shape, the straight line segment joining them lies entirely within the shape.

If any of the constraints are not satisfied, the homography is invalidated, the selected pairs are discarded, and new pairs are selected. If the constraints are satisfied, homography estimation is valid 412, and the homography validator 318 computes 414 a homography score 416.

For valid homographies, the homography score 416 is computed for the estimated homography for the selected pairs. The score can include multiple elements.

An example element of the homography score 416 is normalized center error. To determine normalized center error, the center of the object shape is estimated based on identified corners of the shape. The estimated center of the shape is compared with the estimated object center 312 that was computed by the center estimator 124 using all of the interest point matched pairs 310. The error between the center of the shape based on the selected pairs and the estimated object center 312 can be measured, for example, as a distance in pixels. The error is then normalized by the largest diagonal of the shape. Thus, the normalized center error is a value less than 1.0. A normalized center error close to 0.0 results in a higher score, while the score decreases as the normalized center error trends away from 0.0.

Another example element of the homography score 416 is a size ratio. The homography estimator 126 may receive input indicating a size of the object 105 from previous localizations. For example, the size of the object 105 from previous localizations can include an area of the object as measured in square pixels. In another example, the size of the object 105 from previous localizations can include one or more dimensions of the object as measured in pixels. A size ratio is determined between the current object size based on the estimated homography, and the previous object size. The size ratio is computed by dividing the smaller value by the larger value, so that the resulting ratio is less than 1.0. A size ratio close to 1.0 results in a higher score, while the score decreases as the size ratio trends away from 1.0.

Another example element of the homography score 416 is a side ratio. A side ratio can be computed for an object having a polygon shape with parallel sides of similar length. For example, a side ratio can be computed for both pairs of parallel sides of a rectangular object, such as the doormat. A side ratio can also be computed for a parallelogram, a hexagon, an octagon, etc. The side ratio is a ratio between the lengths of parallel sides of the polygon. The side ratio is computed by dividing the smaller value by the larger value, so that the resulting side ratio is less than 1.0. A side ratio close to 1.0 results in a higher score, while the score decreases as the ratio trends away from 1.0.

The side ratio can be computed for multiple pairs of sides of the shape. For example, for a polygon with N sides, where N is an even number, the side ratio can be computed for N/2 pairs of parallel sides. As an example, for an object with a regular hexagon shape (N=6), the side ratio can be computed for each of N/2=3 pairs of parallel sides.

Another example element of the homography score 416 is an inlier ratio. To determine the inlier ratio, interest points from the reference image 110 are projected to the sample image 130 using the estimated homography matrix. A projection error is computed between the projected interest points and the respective matched interest points in the sample image 130. Inliers can be defined as the interest points for which the projection error meets criteria. For example, the projection error may meet criteria if the projection error is below a threshold, e.g., two pixels, three pixels, or five pixels. The ratio of the number of inliers to the total number of matched points is the inlier ratio. Thus, the inlier ratio is a value less than 1.0. An inlier ratio close to 1.0 results in a higher score, while the score decreases as the ratio trends away from 1.0.

To compute 414 the homography score 416, a weighted sum of the score elements is computed. The weights are positive values that add to 1.0. Equation 1 is an example equation for calculating the score. In Equation 1, N is the number of sides of the polygon.

$$\text{Score} = \\ W1 \times (1 - \text{normalized\_center\_error}) + W2 \times (\text{size\_ratio}) + \\ W3 \times \left( \frac{2}{N} \times \left( \sum_{i}^{N/2} \text{side}i\_\text{ratio} \right) \right) + W4 \times (\text{inlier\_ratio})$$

Equation 1

Though the described example score includes four elements, the score can include more or fewer elements, in any combination. For example, in some cases the score may be calculated using the elements of normalized center ratio, size ratio, and inlier ratio, but might not include the element of side ratio. In some cases the score may be calculated using elements of normalized center ratio and inlier ratio, but might not include size ratio or side ratio.

The process of selecting matched pairs and computing homography scores is iterated 315, e.g., 1,000 times, 2,000, times, or 3,000 times. After performing the iterative RANSAC process, top homographies 418 are selected based on the homography scores. For example the homography validator 318 may select the top five estimated homographies with the highest scores. These top homographies 418 then go through additional stages of refinement and validation.

For each of the top homographies 418, the homography validator 318 obtains inliers 419. As described above, inliers are the interest points for which the projection error meets criteria. The homography validator 318 then performs homography estimation 420 using the inliers 419. The homography matrix is re-estimated using the inlier matched points.

The homography validator 318 determines if the homography estimation is valid 422 using the same validation process as in step 412. If none of the top five estimates result in a valid refined homography, no result is returned. Such a situation may occur if not enough correct matched pairs are found. For example, not enough correct matched pairs may be found when the photometric conditions of the sample image are poor, when the object in the sample image is far from the camera 102, or when the object 105 is not found in the area of interest. If the homography estimation is not valid, then no solution is found and the homography validator 318 does not output a homography matrix. In some examples, if the homography estimation is not valid, another set of top homographies 418 are selected to undergo the process of validation and refinement as described in steps 419, 420, and 422.

If the homography estimation is valid, the homography estimator 126 outputs the valid homography matrix 320. The valid homography matrix 424 is provided to the homographic transformer 322. The homographic transformer 322 uses the valid homography matrix 424 to project the reference image of the object to the sample image in order to obtain the object location 140. The object location 140 includes the estimated center location and the projection of the object corners to the sample image 130.

Figure 5:
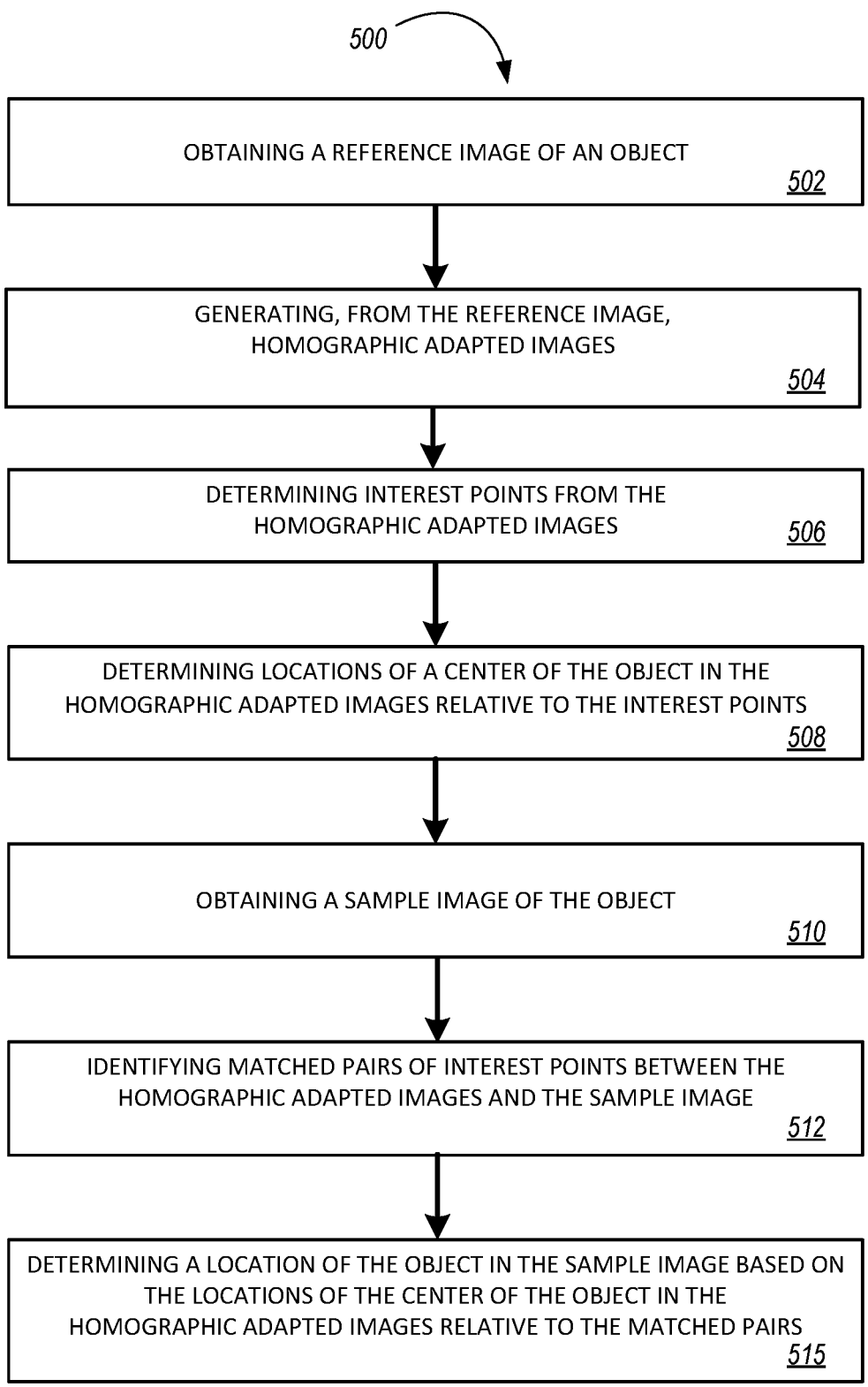
FIG. 5 is a flow diagram of an example process for object localization in video.

FIG. 5 is a flow diagram of an example process 500 for object localization in video. The process 500 can be performed by a computing system, e.g., the camera 102. In some implementations, the process 500 can be performed by another computing system, e.g., a control unit or a monitoring server of a property monitoring system. In some implementations, a first computer may perform certain actions of the process 500, and a second computer may perform certain other actions of the process 500. For example, a first computer may perform steps 502 through 508, and a second computer may perform steps 510 to 515.

The process 500 includes obtaining a reference image of an object (502). For example, the camera 102 obtains the reference image 110 of the object 105.

The process 500 includes generating, from the reference image, homographic adapted images (504). For example, the homographic adaptor 112 generates, from the reference image 110, the homographic adapted images 202. The homographic adapted images 202 show the object 105 at various locations, orientations, and distances with respect to the camera.

The process 500 can include applying, to the homographic adapted images, photometric adaptation that shows the object at various lighting conditions; and determining the interest points from the photometrically adapted homographic images. For example, the homographic adapted images 202 may be adapted by a photometric adaptor 114. The photometric adaptor generates photometric adapted images 204. The photometric adapted images 204 show the object 105 with various illumination levels, brightness, contrast, etc.

The process 500 includes determining interest points from the homographic adapted images (506). For example, the interest point extractor 116 determines interest points 206 from the homographic and photometric adapted images 204. For example, the interest point extractor 116 can determine an interest point 206 that has a coordinate location of [0150,0275].

The process 500 includes determining locations of a center of the object in the homographic adapted images relative to the interest points (508). For example, the center mapper 220 determines relative center locations 214 of the object 105 relative to each of the interest points 206. In some examples, the process 500 includes determining the locations of the center of the object in the homographic adapted images relative to the interest points by determining a two-dimensional pixel offset between each interest point and the center of the object. For example, for an object center positioned at coordinate [0100,0200] and an interest point positioned at coordinate [0150,0275], the relative center location can be represented as an offset [0050,0075].

The process 500 includes obtaining a sample image of the object (510). For example, the camera 102 captures the sample image 130 of the object 105.

The process 500 includes identifying matched pairs of interest points between the homographic adapted images and the sample image (512). For example, the interest point matcher 122 identifies interest points in the object representation 120 that match the sample image interest points 304, where the object representation 120 was generated based on the homographic adapted images 202.

In some implementations, each interest point is associated with one or more descriptors, and the process 500 includes matching the interest point from the homographic images and the interest point in the sample image based on a similarity of the respective associated one or more descriptors. For example, the interest point extractor 116 can extract the interest points 206 and the corresponding descriptors from the photometric adapted images 204. The descriptors can include feature vectors representing characteristics of the interest points 206. The interest point comparator 306 can determine a similarity between descriptors of interest point and determine whether the similarity satisfies similarity criteria.

In some implementations, the process 500 includes generating, from the homographic adapted images, an object representation for the object. The object representation can include the interest points from the homographic adapted images, and for each interest point, one or more descriptors associated with the interest point. The object representation can also include a location of the center of the object relative to the interest point. The process 500 can include comparing the object representation for the object to the sample image to identify the matched pairs of interest points. For example, the representation engine 108 generates the object representation 120 by projecting the interest points 206 to the reference image 110. The interest point comparator 306 can compare the object representation 120 to the sample image interest points 304. The interest point comparator 306 outputs the interest point matched pairs 310.

The process 500 includes determining a location of the object in the sample image based on the locations of the center of the object in the homographic adapted images relative to the matched pairs (515). For example, the localization engine 115 determines the object location 140 based on the estimated object center 312 relative to the matched interest points of the interest point matched pairs 310.

In some implementations, determining the location of the object in the sample image based on the locations of the center of the object in the homographic adapted images relative to the matched pairs includes generating, from the matched pairs, a homography matrix. For example, the homography estimator 126 generates, from the interest point matched pairs 310, the valid homography matrix 320.

Determining the location of the object can include projecting the reference image of the object to the sample image using the homography matrix. For example, the homographic transformer projects the reference image 110 of the object 105 to the sample image using the valid homography matrix 320 to determine the object location 140.

In some implementations, generating, from the matched pairs, the homography matrix includes iteratively computing homography scores for subsets of the matched pairs. For example, the homography validator 318 iteratively computes homography scores 416 for the selected pairs 316.

In some implementations, the homography estimator 126 can receive data indicating a first estimated size of the object 105, e.g., a size of the object determined from previous localizations of the object 105. The homography estimator 126 can determine a second estimated size of the object 105 based on the subset of the matched pairs, e.g., the selected pairs 316. Computing the homography score can include computing a ratio between the first estimated size of the object and the second estimated size of the object. For example, the homography estimator 126 can compute a size ratio between the first estimated size of the object 105 determined from the previous localizations and the second estimated size of the object 105 determined from the selected pairs 316. A size ratio closer to 1.0 results in a higher homography score, while a ratio further from 1.0 results in a lower homography score.

In some implementations, the homography estimator 126 can determine a length of a first side of the object 105 based on the selected pairs 316, and a length of a second side of the object 105 based on the selected pairs 316, where the second side is parallel to the first side. Computing the homography score can include computing a ratio between the length of the first side and the length of the second side. For example, the homography estimator 126 can compute a side ratio between the determined lengths of the parallel sides of the object 105. A side ratio closer to 1.0 results in a higher homography score, while a ratio further from 1.0 results in a lower homography score.

Generating the homography matrix can include selecting subsets of matched pairs based on the computed homography scores. For example, the homography validator 318 can select the selected pairs 316 having the top homographies 418. The top homographies 418 can be, for example, the six selected pairs having the highest homographies scores and/or having scores that are closest to a value of 1.0.

Generating the homography matrix can include generating the homography matrix from the selected subsets of matched pairs. For example, the homography validator 318 can estimate a homography matrix from the selected pairs having the top homographies 418. The homography validator 318 performs a validation process to determine whether the estimated homography matrix is valid. The homography validator 318 can then output the valid homography matrix 424.

In some implementations, the process 500 includes determining, based on the locations of the center of the object in the homographic adapted images relative to the interest points and based on the identified matched pairs of interest points, a first estimated center location of the object in the sample image. For example, the center estimator 124 determines, based on the interest point matched pairs 310, the estimated object center 312. The estimate object center 312 can be, for example, a coordinate position of [0230,0310].

In some implementations, the process 500 includes iteratively computing homography scores for subsets of the matched pairs by determining, based on the subset of the matched pairs, a second estimated center location of the object in the sample image, and determining an error between the first estimated center location of the object in the sample image and the second estimated center location of the object in the sample image. For example, the homography validator 318 can iteratively compute homography scores 416 for the selected pairs 316.

The homography validator 318 can determine, based on the selected pairs 316, an estimated center location of the object in the sample image of [0220,0320]. The homography validator 318 can determine a center error between the estimated center location of the object of [0220,0320] and the estimated object center 312 of [0230,0310]. The center error can be, e.g., an offset error of [10, +10] or a distance of 14.1. The center error can be normalized, e.g., by a diagonal of the shape of the object, e.g., a diagonal length of 270 pixels, to obtain a normalized center error of 0.05. A normalized error closer to 0.0 results in a higher homography score.

In some implementations, the process 500 includes, based on projecting the reference image of the object to the sample image using the homography matrix, determining the location of the center of the object in the sample image and determining locations of corners of the object in the sample image. For example, based on projecting the reference image of the object 105 to the sample image 130 using the valid homography matrix 320, the homographic transformer 322 can determine the location of the center of the object 105 and the locations of corners of the object 105 in the sample image 130.

In some implementations, determining the location of the object in the sample image includes determining a coordinate location of at least one of a center, an edge, or a corner of the object in the sample image. For example, the object location 140 can include a coordinate location of [0100, 0200] for a center of the object, and a coordinate location of [0050,0080] for a corner of the object. The object location 140 can also include a coordinate location of [0060,0090] for a point at an edge of the object.

In some implementations, determining the location of the object in the sample image includes determining at least one of a shape, a size, or an orientation of the object in the sample image. For example, the localization engine 115 can determine that the object 105 has a rectangular shape. The localization engine 115 can also determine that the object 105 has a size of twenty-five by thirty-five pixels, and that the object 105 has an orientation of forty-five degrees relative to vertical.

In some implementations, the sample image includes an image captured by a camera. The process 500 can include identifying an area of a field of view of the camera that corresponds to the location of the object; and classifying the identified area of the field of view of the camera as an area of interest. For example, the sample image 130 is captured by the camera 102. The process 500 can include identifying an area of the field of view 111 of the camera 102 that corresponds to the location of the object 105 as an area of interest.

The process 500 can include obtaining additional images captured by the camera; and performing an action in response to detecting motion within the classified area of interest of the additional images. For example, the camera 102 can monitor the area of interest corresponding to the object 105 for activity. For example, when the camera 102 detects an object such as a person or package within the area of interest, the camera 102 can perform an action such as generating a notification.

Figure 6:
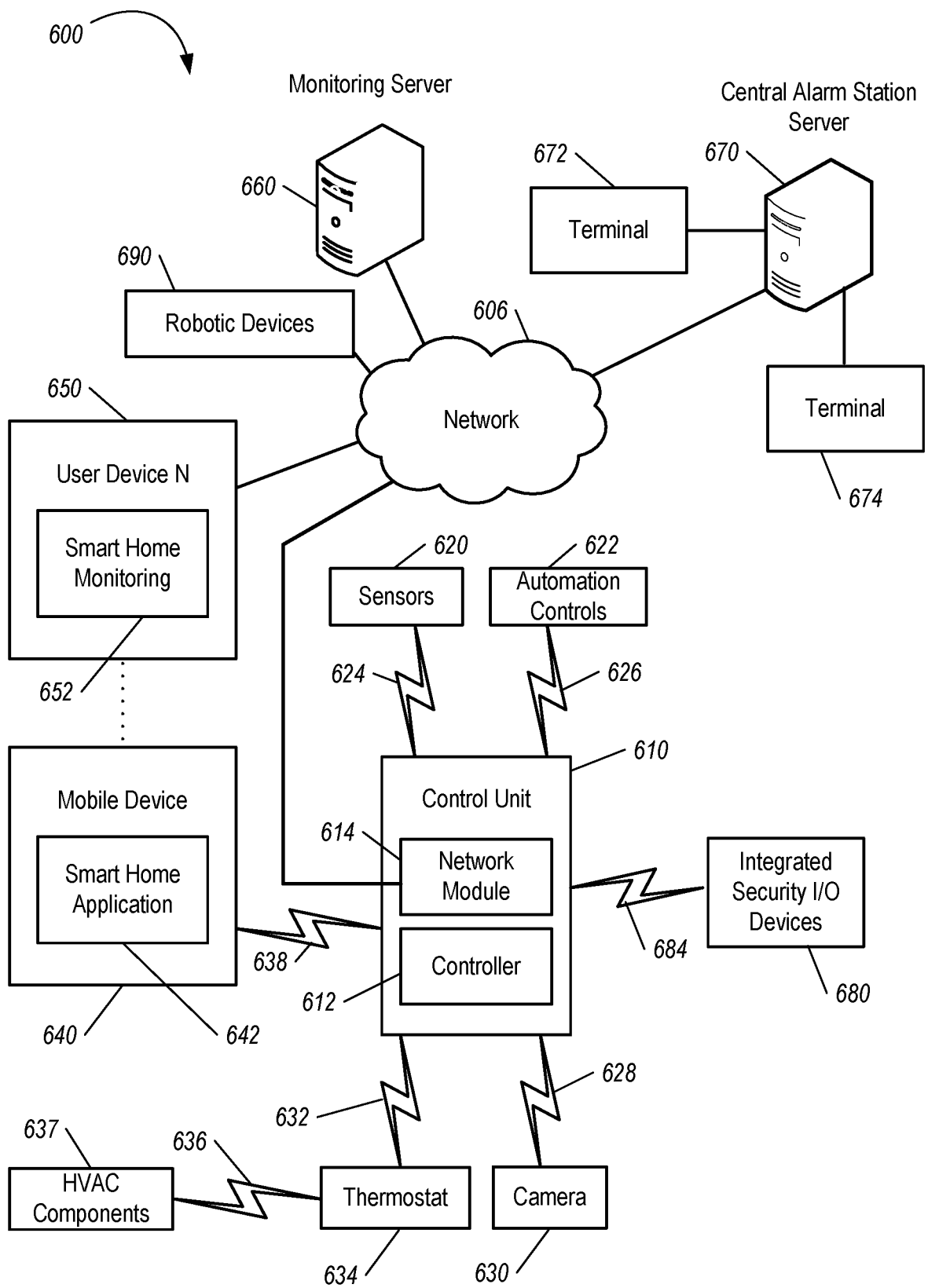
FIG. 6 is a diagram illustrating an example of a home monitoring system.

FIG. 6 is a diagram illustrating an example of a home monitoring system 600. The monitoring system 600 includes a network 605, a control unit 610, one or more user devices 640 and 650, a monitoring server 660, and a central alarm station server 670. In some examples, the network 605 facilitates communications between the control unit 610, the one or more user devices 640 and 650, the monitoring server 660, and the central alarm station server 670.

The network 605 is configured to enable exchange of electronic communications between devices connected to the network 605. For example, the network 605 may be configured to enable exchange of electronic communications between the control unit 610, the one or more user devices 640 and 650, the monitoring server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit 610 to communicate over a local area network and/or the Internet. The network module 614 also may be a voice band modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 620 can also include a radio-frequency identification (RFID) sensor that identifies a particular article that includes a pre-assigned RFID tag.

The control unit 610 communicates with the home automation controls 622 and a camera 630 to perform monitoring. The home automation controls 622 are connected to one or more devices that enable automation of actions in the home. For instance, the home automation controls 622 may be connected to one or more lighting systems and may be configured to control operation of the one or more lighting systems. In addition, the home automation controls 622 may be connected to one or more electronic locks at the home and may be configured to control operation of the one or more electronic locks (e.g., control Z-Wave locks using wireless communications in the Z-Wave protocol). Further, the home automation controls 622 may be connected to one or more appliances at the home and may be configured to control operation of the one or more appliances. The home automation controls 622 may include multiple modules that are each specific to the type of device being controlled in an automated manner. The home automation controls 622 may control the one or more devices based on commands received from the control unit 610. For instance, the home automation controls 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building or home monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the home automation controls 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring server 660 over the Internet. In these implementations, image data captured by the camera 630 does not pass through the control unit 610 and the camera 630 receives commands related to operation from the monitoring server 660.

The system 600 also includes thermostat 634 to perform dynamic environmental control at the home. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a home and/or environmental data at a home, e.g., at various locations indoors and outdoors at the home. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634. In some implementations, the thermostat 634 is controlled via one or more home automation controls 622.

A module 637 is connected to one or more components of an HVAC system associated with a home, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

In some examples, the system 600 further includes one or more robotic devices 690. The robotic devices 690 may be any type of robots that are capable of moving and taking actions that assist in home monitoring. For example, the robotic devices 690 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 690 may be devices that are intended for other purposes and merely associated with the system 600 for use in appropriate circumstances. For instance, a robotic vacuum cleaner device may be associated with the monitoring system 600 as one of the robotic devices 690 and may be controlled to take action responsive to monitoring system events.

In some examples, the robotic devices 690 automatically navigate within a home. In these examples, the robotic devices 690 include sensors and control processors that guide movement of the robotic devices 690 within the home. For instance, the robotic devices 690 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 690 may include control processors that process output from the various sensors and control the robotic devices 690 to move along a path that reaches the desired destination and avoids obstacles. In this regard, the control processors detect walls or other obstacles in the home and guide movement of the robotic devices 690 in a manner that avoids the walls and other obstacles.

In addition, the robotic devices 690 may store data that describes attributes of the home. For instance, the robotic devices 690 may store a floorplan and/or a three-dimensional model of the home that enables the robotic devices 690 to navigate the home. During initial configuration, the robotic devices 690 may receive the data describing attributes of the home, determine a frame of reference to the data (e.g., a home or reference location in the home), and navigate the home based on the frame of reference and the data describing attributes of the home. Further, initial configuration of the robotic devices 690 also may include learning of one or more navigation patterns in which a user provides input to control the robotic devices 690 to perform a specific navigation action (e.g., fly to an upstairs bedroom and spin around while capturing video and then return to a home charging base). In this regard, the robotic devices 690 may learn and store the navigation patterns such that the robotic devices 690 may automatically repeat the specific navigation actions upon a later request.

In some examples, the robotic devices 690 may include data capture and recording devices. In these examples, the robotic devices 690 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 690 to take and store a biometric sample that can be used to identify the person (e.g., a biometric sample with DNA that can be used for DNA testing).

In some implementations, the robotic devices 690 may include output devices. In these implementations, the robotic devices 690 may include one or more displays, one or more speakers, and/or any type of output devices that allow the robotic devices 690 to communicate information to a nearby user.

The robotic devices 690 also may include a communication module that enables the robotic devices 690 to communicate with the control unit 610, each other, and/or other devices. The communication module may be a wireless communication module that allows the robotic devices 690 to communicate wirelessly. For instance, the communication module may be a Wi-Fi module that enables the robotic devices 690 to communicate over a local wireless network at the home. The communication module further may be a 900 MHz wireless communication module that enables the robotic devices 690 to communicate directly with the control unit 610. Other types of short-range wireless communication protocols, such as Bluetooth, Bluetooth LE, Z-wave, Zigbee, etc., may be used to allow the robotic devices 690 to communicate with other devices in the home. In some implementations, the robotic devices 690 may communicate with each other or with other devices of the system 600 through the network 605.

The robotic devices 690 further may include processor and storage capabilities. The robotic devices 690 may include any suitable processing devices that enable the robotic devices 690 to operate applications and perform the actions described throughout this disclosure. In addition, the robotic devices 690 may include solid-state electronic storage that enables the robotic devices 690 to store applications, configuration data, collected sensor data, and/or any other type of information available to the robotic devices 690.

The robotic devices 690 are associated with one or more charging stations. The charging stations may be located at predefined home base or reference locations in the home. The robotic devices 690 may be configured to navigate to the charging stations after completion of tasks needed to be performed for the monitoring system 600. For instance, after completion of a monitoring operation or upon instruction by the control unit 610, the robotic devices 690 may be configured to automatically fly to and land on one of the charging stations. In this regard, the robotic devices 690 may automatically maintain a fully charged battery in a state in which the robotic devices 690 are ready for use by the monitoring system 600.

The charging stations may be contact based charging stations and/or wireless charging stations. For contact based charging stations, the robotic devices 690 may have readily accessible points of contact that the robotic devices 690 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 690 may charge through a wireless exchange of power. In these cases, the robotic devices 690 need only locate themselves closely enough to the wireless charging stations for the wireless exchange of power to occur. In this regard, the positioning needed to land at a predefined home base or reference location in the home may be less precise than with a contact based charging station. Based on the robotic devices 690 landing at a wireless charging station, the wireless charging station outputs a wireless signal that the robotic devices 690 receive and convert to a power signal that charges a battery maintained on the robotic devices 690.

In some implementations, each of the robotic devices 690 has a corresponding and assigned charging station such that the number of robotic devices 690 equals the number of charging stations. In these implementations, the robotic devices 690 always navigate to the specific charging station assigned to that robotic device. For instance, a first robotic device may always use a first charging station and a second robotic device may always use a second charging station.

In some examples, the robotic devices 690 may share charging stations. For instance, the robotic devices 690 may use one or more community charging stations that are capable of charging multiple robotic devices 690. The community charging station may be configured to charge multiple robotic devices 690 in parallel. The community charging station may be configured to charge multiple robotic devices 690 in serial such that the multiple robotic devices 690 take turns charging and, when fully charged, return to a predefined home base or reference location in the home that is not associated with a charger. The number of community charging stations may be less than the number of robotic devices 690.

In addition, the charging stations may not be assigned to specific robotic devices 690 and may be capable of charging any of the robotic devices 690. In this regard, the robotic devices 690 may use any suitable, unoccupied charging station when not in use. For instance, when one of the robotic devices 690 has completed an operation or is in need of battery charge, the control unit 610 references a stored table of the occupancy status of each charging station and instructs the robotic device to navigate to the nearest charging station that is unoccupied.

The system 600 further includes one or more integrated security devices 680. The one or more integrated security devices may include any type of device used to provide alerts based on received sensor data. For instance, the one or more control units 610 may provide one or more alerts to the one or more integrated security input/output devices 680. Additionally, the one or more control units 610 may receive one or more sensor data from the sensors 620 and determine whether to provide an alert to the one or more integrated security input/output devices 680.

The sensors 620, the home automation controls 622, the camera 630, the thermostat 634, and the integrated security devices 680 may communicate with the controller 612 over communication links 624, 626, 628, 632, 638, and 684. The communication links 624, 626, 628, 632, 638, and 684 may be a wired or wireless data pathway configured to transmit signals from the sensors 620, the home automation controls 622, the camera 630, the thermostat 634, and the integrated security devices 680 to the controller 612. The sensors 620, the home automation controls 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 638, and 684 may include a local network. The sensors 620, the home automation controls 622, the camera 630, the thermostat 634, and the integrated security devices 680, and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 660 is an electronic device configured to provide monitoring services by exchanging electronic communications with the control unit 610, the one or more user devices 640 and 650, and the central alarm station server 670 over the network 605. For example, the monitoring server 660 may be configured to monitor events generated by the control unit 610. In this example, the monitoring server 660 may exchange electronic communications with the network module 614 included in the control unit 610 to receive information regarding events detected by the control unit 610. The monitoring server 660 also may receive information regarding events from the one or more user devices 640 and 650.

In some examples, the monitoring server 660 may route alert data received from the network module 614 or the one or more user devices 640 and 650 to the central alarm station server 670. For example, the monitoring server 660 may transmit the alert data to the central alarm station server 670 over the network 605.

The monitoring server 660 may store sensor and image data received from the monitoring system and perform analysis of sensor and image data received from the monitoring system. Based on the analysis, the monitoring server 660 may communicate with and control aspects of the control unit 610 or the one or more user devices 640 and 650.

The monitoring server 660 may provide various monitoring services to the system 600. For example, the monitoring server 660 may analyze the sensor, image, and other data to determine an activity pattern of a resident of the home monitored by the system 600. In some implementations, the monitoring server 660 may analyze the data for alarm conditions or may determine and perform actions at the home by issuing commands to one or more of the controls 622, possibly through the control unit 610.

The monitoring server 660 can be configured to provide information (e.g., activity patterns) related to one or more residents of the home monitored by the system 600. For example, one or more of the sensors 620, the home automation controls 622, the camera 630, the thermostat 634, and the integrated security devices 680 can collect data related to a resident including location information (e.g., if the resident is home or is not home) and provide location information to the thermostat 634.

The central alarm station server 670 is an electronic device configured to provide alarm monitoring service by exchanging communications with the control unit 610, the one or more user devices 640 and 650, and the monitoring server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more user devices 640 and 650 and/or the monitoring server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and 674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more authorized user devices 640 and 650 are devices that host and display user interfaces. For instance, the user device 640 is a mobile device that hosts or runs one or more native applications (e.g., the home monitoring application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a home monitoring application 652. The home monitoring application 642 refers to a software/firmware program running on the corresponding mobile device that enables the user interface and features described throughout. The user device 640 may load or install the home monitoring application 642 based on data received over a network or data received from local media. The home monitoring application 642 runs on mobile devices platforms, such as iPhone, iPod touch, Blackberry, Google Android, Windows Mobile, etc. The home monitoring application 642 enables the user device 640 to receive and process image and sensor data from the monitoring system.

The user device 640 may be a general-purpose computer (e.g., a desktop personal computer, a workstation, or a laptop computer) that is configured to communicate with the monitoring server 660 and/or the control unit 610 over the network 605. The user device 640 may be configured to display a smart home user interface 652 that is generated by the user device 640 or generated by the monitoring server 660. For example, the user device 640 may be configured to display a user interface (e.g., a web page) provided by the monitoring server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Z-wave, Zigbee, HomePlug (ethernet over power line), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In other implementations, the one or more user devices 640 and 650 receive monitoring system data captured by the control unit 610 through the network 605. The one or more user devices 640, 650 may receive the data from the control unit 610 through the network 605 or the monitoring server 660 may relay data received from the control unit 610 to the one or more user devices 640 and 650 through the network 605. In this regard, the monitoring server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 includes the one or more user devices 640 and 650, the sensors 620, the home automation controls 622, the camera 630, and the robotic devices 690. The one or more user devices 640 and 650 receive data directly from the sensors 620, the home automation controls 622, the camera 630, and the robotic devices 690, and sends data directly to the sensors 620, the home automation controls 622, the camera 630, and the robotic devices 690. The one or more user devices 640, 650 provide the appropriate interfaces/processing to provide visual surveillance and reporting.

In other implementations, the system 600 further includes network 605 and the sensors 620, the home automation controls 622, the camera 630, the thermostat 634, and the robotic devices 690, and are configured to communicate sensor and image data to the one or more user devices 640 and 650 over network 605 (e.g., the Internet, cellular network, etc.). In yet another implementation, the sensors 620, the home automation controls 622, the camera 630, the thermostat 634, and the robotic devices 690 (or a component, such as a bridge/router) are intelligent enough to change the communication pathway from a direct local pathway when the one or more user devices 640 and 650 are in close physical proximity to the sensors 620, the home automation controls 622, the camera 630, the thermostat 634, and the robotic devices 690 to a pathway over network 605 when the one or more user devices 640 and 650 are farther from the sensors 620, the home automation controls 622, the camera 630, the thermostat 634, and the robotic devices 690.

In some examples, the system leverages GPS information from the one or more user devices 640 and 650 to determine whether the one or more user devices 640 and 650 are close enough to the sensors 620, the home automation controls 622, the camera 630, the thermostat 634, and the robotic devices 690 to use the direct local pathway or whether the one or more user devices 640 and 650 are far enough from the sensors 620, the home automation controls 622, the camera 630, the thermostat 634, and the robotic devices 690 that the pathway over network 605 is required.

In other examples, the system leverages status communications (e.g., pinging) between the one or more user devices 640 and 650 and the sensors 620, the home automation controls 622, the camera 630, the thermostat 634, and the robotic devices 690 to determine whether communication using the direct local pathway is possible. If communication using the direct local pathway is possible, the one or more user devices 640 and 650 communicate with the sensors 620, the home automation controls 622, the camera 630, the thermostat 634, and the robotic devices 690 using the direct local pathway. If communication using the direct local pathway is not possible, the one or more user devices 640 and 650 communicate with the sensors 620, the home automation controls 622, the camera 630, the thermostat 634, and the robotic devices 690 using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "away" state, but set not to capture images when the alarm system is armed in a "home" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
maintaining:
two or more homographic adapted images that a) were generated by projecting a reference image of an object to a multi-dimensional model of a field of view of a camera, b) each depict a simulated appearance of the object at a particular location and a particular orientation relative to the camera, and c) include a first homographic adapted image depicting the object at a different location, orientation, or both, relative to the camera, than a second homographic adapted image; and
interest points that were determined from the two or more homographic adapted images;
obtaining a sample image of the object;
identifying matched pairs of interest points, each matched pair comprising an interest point from the two or more homographic adapted images and a matching interest point in the sample image;
generating, using the matched pairs, a homography matrix; and
projecting the reference image of the object to the sample image using the homography matrix to determine a location of the object in the sample image.

2. The method of claim 1, comprising:
based on projecting the reference image of the object to the sample image using the homography matrix, determining (i) a location of the center of the object in the sample image and (ii) locations of corners of the object in the sample image.

3. The method of claim 1, wherein generating, from the matched pairs, the homography matrix comprises:
iteratively computing homography scores for subsets of the matched pairs;
selecting subsets of matched pairs based on the computed homography scores; and
generating the homography matrix from the selected subsets of matched pairs.

4. The method of claim 3, wherein computing a homography score for a subset of the matched pairs comprises:
receiving data indicating a first estimated size of the object based on a previous image;
determining a second estimated size of the object based on the subset of the matched pairs; and
computing a ratio between the first estimated size of the object and the second estimated size of the object.

5. The method of claim 3, wherein computing a homography score for a subset of the matched pairs comprises:
determining a length of a first side of the object based on the subset of the matched pairs;
determining a length of a second side of the object based on the subset of the matched pairs, wherein the second side is parallel to the first side; and
computing a ratio between the length of the first side and the length of the second side.

6. The method of claim 1, comprising:
determining, based on locations of the center of the object in the two or more homographic adapted images relative to the interest points and based on the identified matched pairs of interest points, a first estimated center location of the object in the sample image.

7. The method of claim 6, comprising:
iteratively computing homography scores for subsets of the matched pairs by:
determining, based on the subset of the matched pairs, a second estimated center location of the object in the sample image; and
determining an error between the first estimated center location of the object in the sample image and the second estimated center location of the object in the sample image;
selecting subsets of matched pairs based on the computed homography scores; and
generating the homography matrix from the selected subsets of matched pairs.

8. The method of claim 1, comprising:
applying, to the two or more homographic adapted images, photometric adaptation that shows the object at various lighting conditions to produce photometric and homographic adapted images; and
determining the interest points from the photometric and homographic adapted images.

9. The method of claim 1, wherein each interest point is associated with one or more descriptors, the method comprising:
matching the interest point from the two or more homographic adapted images and the interest point in the sample image based on a similarity of the respective associated one or more descriptors.

10. The method of claim 1, comprising:
generating, from the two or more homographic adapted images, an object representation for the object, the object representation comprising:
the interest points from the two or more homographic adapted images; and
for each interest point:
one or more descriptors associated with the interest point; and
a location of the center of the object relative to the interest point.

11. The method of claim 10, comprising:
comparing the object representation for the object to the sample image to identify the matched pairs of interest points.

12. The method of claim 1, comprising determining locations of the center of the object in the two or more homographic adapted images relative to the interest points by determining a two-dimensional pixel offset between each interest point and the center of the object.

13. The method of claim 1, wherein determining the location of the object in the sample image comprises determining a coordinate location of at least one of a center, an edge, or a corner of the object in the sample image.

14. The method of claim 1, wherein determining the location of the object in the sample image comprises determining at least one of a shape, a size, or an orientation of the object in the sample image.

15. The method of claim 1, wherein the sample image comprises an image captured by a camera.

16. The method of claim 15, comprising:
identifying an area of a field of view of the camera that corresponds to the location of the object; and
classifying the identified area of the field of view of the camera as an area of interest.

17. The method of claim 16, comprising:
obtaining additional images captured by the camera; and
performing an action in response to detecting motion within the classified area of interest of the additional images.

18. A system comprising:
one or more computers and one or more storage devices storing instructions that are operable, when executed by the one or more computers, to cause the one or more computers to perform operations comprising:
maintaining:
two or more homographic adapted images that a) were generated by projecting a reference image of an object to a multi-dimensional model of a field of view of a camera, b) each depict a simulated appearance of the object at a particular location and a particular orientation relative to the camera, and c) include a first homographic adapted image depicting the object at a different location, orientation, or both, relative to the camera, than a second homographic adapted image;
applying, to the two or more homographic adapted images, photometric adaptation that shows the object at various lighting conditions to produce photometric and homographic adapted images;
determining interest points from the photometric and homographic adapted images;
determining locations of a center of the object in the photometric and homographic adapted images relative to the interest points;
obtaining a sample image of the object;
identifying matched pairs of interest points, each matched pair comprising an interest point from the photometric and homographic adapted images and a matching interest point in the sample image; and
determining a location of the object in the sample image based on the locations of the center of the object in the photometric and homographic adapted images relative to the matched pairs.

19. A non-transitory computer-readable medium storing software comprising instructions executable by one or more computers which, upon such execution, cause the one or more computers to perform operations comprising:
maintaining:
two or more homographic adapted images that a) were generated by projecting a reference image of an object to a multi-dimensional model of a field of view of a camera, b) each depict a simulated appearance of the object at a particular location and a particular orientation relative to the camera, and c) include a first homographic adapted image depicting the object at a different location, orientation, or both, relative to the camera, than a second homographic adapted image; and
interest points that were determined from the two or more homographic adapted images;
obtaining a sample image of the object;
identifying matched pairs of interest points, each matched pair comprising an interest point from the two or more homographic adapted images and a matching interest point in the sample image; and
determining a location of the object in the sample image based on the locations of the center of the object in the homographic adapted images relative to the matched pairs, wherein determining the location of the object in the sample image comprises determining a coordinate location of at least one of a center, an edge, or a corner of the object in the sample image.

* * * * *